(12) United States Patent
Iwata et al.

(10) Patent No.: US 9,174,875 B2
(45) Date of Patent: *Nov. 3, 2015

(54) INORGANIC FIBROUS MOLDED REFRACTORY ARTICLE, METHOD FOR PRODUCING INORGANIC FIBROUS MOLDED REFRACTORY ARTICLE, AND INORGANIC FIBROUS UNSHAPED REFRACTORY COMPOSITION

(75) Inventors: Koji Iwata, Tokyo (JP); Ken Yonaiyama, Tokyo (JP)

(73) Assignee: Nichias Corporation, Tokyo (JP)

( * ) Notice: Subject to any disclaimer, the term of this patent is extended or adjusted under 35 U.S.C. 154(b) by 588 days.

This patent is subject to a terminal disclaimer.

(21) Appl. No.: 13/520,891

(22) PCT Filed: Dec. 24, 2010

(86) PCT No.: PCT/JP2010/073272
§ 371 (c)(1),
(2), (4) Date: Dec. 21, 2012

(87) PCT Pub. No.: WO2011/083695
PCT Pub. Date: Jul. 14, 2011

(65) Prior Publication Data
US 2013/0090224 A1      Apr. 11, 2013

(30) Foreign Application Priority Data
Jan. 7, 2010   (JP) ................. 2010-001937

(51) Int. Cl.
| | | |
|---|---|---|
| C04B 35/80 | (2006.01) |
| C04B 35/22 | (2006.01) |
| C04B 26/04 | (2006.01) |
| C04B 35/82 | (2006.01) |
| B22D 41/02 | (2006.01) |
| B28B 1/52 | (2006.01) |
| C04B 26/28 | (2006.01) |
| C04B 28/00 | (2006.01) |
| C04B 28/24 | (2006.01) |
| C04B 30/02 | (2006.01) |
| C04B 35/66 | (2006.01) |
| F27D 1/00 | (2006.01) |
| C04B 35/626 | (2006.01) |
| C04B 35/20 | (2006.01) |
| C04B 35/636 | (2006.01) |
| C04B 33/36 | (2006.01) |
| C04B 111/00 | (2006.01) |
| C04B 111/28 | (2006.01) |

(52) U.S. Cl.
CPC ............ *C04B 35/22* (2013.01); *B22D 41/02* (2013.01); *B28B 1/52* (2013.01); *C04B 26/04* (2013.01); *C04B 26/28* (2013.01); *C04B 28/005* (2013.01); *C04B 28/24* (2013.01); *C04B 30/02* (2013.01); *C04B 33/36* (2013.01); *C04B 35/20* (2013.01); *C04B 35/6263* (2013.01); *C04B 35/62625* (2013.01); *C04B 35/636* (2013.01); *C04B 35/66* (2013.01); *C04B 35/82* (2013.01); *F27D 1/0006* (2013.01); *F27D 1/0009* (2013.01); *C04B 2111/00431* (2013.01); *C04B 2111/28* (2013.01); *C04B 2235/349* (2013.01); *C04B 2235/3418* (2013.01); *C04B 2235/3445* (2013.01); *C04B 2235/3454* (2013.01); *C04B 2235/526* (2013.01); *C04B 2235/5228* (2013.01); *C04B 2235/5232* (2013.01); *C04B 2235/5264* (2013.01); *C04B 2235/5276* (2013.01); *C04B 2235/5296* (2013.01); *C04B 2235/6027* (2013.01); *C04B 2235/9615* (2013.01)

(58) Field of Classification Search
USPC ........................ 501/95.1, 95.2, 95.3
See application file for complete search history.

(56) References Cited

U.S. PATENT DOCUMENTS

| | | | |
|---|---|---|---|
| 3,785,838 A | | 1/1974 | Wiedman |
| 3,804,701 A | | 4/1974 | Bognar |
| 4,873,209 A | * | 10/1989 | Gnyra .................. 501/95.1 |
| 6,043,172 A | * | 3/2000 | Hart ..................... 501/95.1 |

(Continued)

FOREIGN PATENT DOCUMENTS

| | | |
|---|---|---|
| JP | 63-235600 | 9/1988 |
| JP | 63-297256 | 12/1988 |
| JP | 04-012071 | 1/1992 |

(Continued)

OTHER PUBLICATIONS

Warheit D.B. et al., "Pulmonary exposures to Sepiolite nanoclay particulates in rates: Resolution following multinucleate giant cell formation," Toxicology Letters, Elsevier Biomedical Press, Amsterdam, NL, vol. 192, No. 3, online on Nov. 10, 2009, pp. 286-293.

*Primary Examiner* — Anthony J Green
*Assistant Examiner* — Elizabeth A Bolden
(74) *Attorney, Agent, or Firm* — Steptoe & Johnson LLP

(57) ABSTRACT

An inorganic fibrous shaped refractory article having a high bio-solubility which is capable of exhibiting a desired heat resistance without containing expensive ceramic fibers, alumina powder and silica powder can be provided at a low production cost and with a low product price. An inorganic fibrous shaped refractory article includes 2 to 95 mass % of rock wool, 2 to 95 mass % of inorganic powder having a needle-like crystal structure and 3 to 32 mass % of a binder. Preferably, in the an inorganic fibrous shaped refractory article, the inorganic powder having a needle-like crystal structure has an average length of 1 to 3000 μm and an aspect ratio of 1 to 1000, and more preferably the inorganic powder having a needle-like crystal structure is wollostonite powder or sepiolite powder.

17 Claims, No Drawings

(56) References Cited

U.S. PATENT DOCUMENTS 6,987,076 B1 1/2006 Jubb et al.
2009/0156386 A1* 6/2009 Freeman et al. ............ 501/95.1

FOREIGN PATENT DOCUMENTS

| | | |
|---|---|---|
| JP | 06-316467 | 11/1994 |
| JP | 2001-192278 | 7/2001 |
| JP | 2003-055888 | 2/2003 |
| JP | 2003-287374 | 10/2003 |
| JP | 2003-292383 | 10/2003 |
| JP | 2008-162853 | 7/2008 |
| WO | WO 00/15574 | 3/2000 |
| WO | 0015574 A | 11/2001 |

* cited by examiner

INORGANIC FIBROUS MOLDED REFRACTORY ARTICLE, METHOD FOR PRODUCING INORGANIC FIBROUS MOLDED REFRACTORY ARTICLE, AND INORGANIC FIBROUS UNSHAPED REFRACTORY COMPOSITION

TECHNICAL FIELD

The invention relates to an inorganic fibrous shaped refractory article, a method for producing an inorganic fibrous molded refractory article, and an inorganic fibrous unshaped refractory composition.

BACKGROUND ART

Conventionally, in an industrial furnace, a firing furnace, a heat-treatment apparatus or the like, as a lining material or a heat-insulating material for a ceiling, a wall or the like inside of a heating chamber, a relatively heavy refractory material such as brick has been used. In recent years, an inorganic fibrous shaped refractory article formed mainly of inorganic fibers has come to be used (see Patent Document 1 (JP-A-2001-192278), for example).

An inorganic fibrous shaped refractory article contains inorganic fibers, a binder for binding the inorganic fibers, and an inorganic filler which is optionally added. As the above-mentioned inorganic fibers, in order to improve the heat resistance as well as to reduce the density of the shaped article, ceramic fibers such as alumina silicate fibers have been used. As the above-mentioned inorganic filler, alumina powder or silica powder has been used in order to improve heat resistance.

However, since the ceramic fibers such as the alumina silicate fibers or the inorganic fillers such as alumina powder or silica powder are expensive, there is a technical problem that the production cost and the product price of the inorganic fibrous shaped article are increased.

Further, in an apparatus for casting aluminum, magnesium or the like, when a plurality of the above-mentioned inorganic fibrous shaped articles are combined to be used as a lining material of a member which contacts a molten material, such as a drainpipe, a molten material holding furnace and a ladel, a paste-like inorganic fibrous unshaped refractory composition is used in spaces between the combined articles (joint) or the like. Since this paste-like inorganic fibrous unshaped refractory composition is obtained by adding a liquid solvent to the same materials as those of the inorganic fibrous shaped refractory article, there is also a technical problem that the production cost and the product price are increased.

RELATED ART DOCUMENTS

Patent Documents

Patent Document 1: JP-A-2001-192278

SUMMARY OF THE INVENTION

Subject to be Solved by the Invention

Under such circumstances, the invention is aimed at providing an inorganic fibrous shaped refractory article which can exhibit high heat resistance and can be produced at a low cost and can be provided with a low price without using ceramic fibers as the inorganic fibers or without using alumina powder or silica powder as the inorganic filler, as well as to provide a method for producing the inorganic fibrous shaped refractory article easily. Further, the invention is aimed at providing an inorganic fibrous unshaped refractory composition which can exhibit high heat resistance and can be produced at a low cost and provided with a low price without using ceramic fibers as the inorganic fibers or without using alumina powder or silica powder as the inorganic filler.

Means for Solving the Subject

In order to attain the above-mentioned objects, the inventors made intensive studies. As a result, the inventors have found that the above-mentioned objects can be attained by producing an inorganic fibrous shaped refractory article and an inorganic fibrous unshaped refractory composition using materials comprising 2 to 95 mass % of rock wool, 2 to 95 mass % of inorganic powder having a needle-like crystal structure and 3 to 32 mass % of a binder. The invention has been made based on this finding.

That is, the invention provides:

(1) An inorganic fibrous shaped refractory article comprising materials comprising 2 to 95 mass % of rock wool, 2 to 95 mass % of inorganic powder having a needle-like crystal structure and 3 to 32 mass % of a binder, (2) The inorganic fibrous shaped refractory article according to (1), wherein the inorganic powder having a needle-like crystal structure has an average length of 1 to 3000 µm and an aspect ratio of 1 to 1000.

(3) The inorganic fibrous shaped refractory article according to (1) or (2), wherein the inorganic powder having a needle-like crystal structure is wollostonite powder or sepiolite powder, (4) A method for producing an inorganic fibrous shaped refractory article, wherein a slurry comprising materials comprising, in terms of solid matters, 2 to 95 mass % of rock wool, 2 to 95 mass % of inorganic powder having a needle-like crystal structure and 3 to 32 mass % of a binder is subjected to dehydration shaping, and (5) An inorganic fibrous unshaped refractory composition comprising materials comprising, in terms of solid matters, 2 to 95 mass % of rock wool, 2 to 95 mass % of inorganic powder having a needle-like crystal structure and 3 to 32 mass % of a binder.

Advantageous Effects of the Invention

According to the invention, by containing a specific amount of rock wool and a specific amount of inorganic powder having a needle-like crystal structure, it is possible to provide an inorganic fibrous shaped refractory article which can exhibit desired heat resistance and can be produced at a low cost and can be provided with a low price without using ceramic fibers, alumina powder and silica powder. Further, according to the invention, it is possible to provide a method for producing the above-mentioned inorganic fibrous shaped refractory article easily. According to the invention, it is possible to provide an inorganic fibrous unshaped refractory composition which can be produced at a low cost and can be provided with a low price.

MODE FOR CARRYING OUT THE INVENTION

Inorganic Fibrous Shaped Refractory Article

At first, an explanation will be made on the inorganic fibrous shaped refractory article of the invention.

The inorganic fibrous shaped refractory article of the invention is formed from materials comprising 2 to 95 mass % of rock wool, 2 to 95 mass % of inorganic powder having a needle-like crystal structure and 3 to 32 mass % of a binder.

In the inorganic fibrous shaped refractory article of the invention, the rock wool may be one which is obtained from a natural mineral or may be one which is obtained from a blast furnace slag.

The rock wool can be produced by blowing into fiber by centrifugal force or the like a molten product obtained by melting a raw material such as basalt or a blast furnace slag in a cupola or an electric furnace at 1500° C. to 1600° C. or a molten slag in the high-temperature state which is taken out from a blast furnace. The rook wool, although if differs depending on the raw material, is normally a fibrous material which comprises 35 to 45 mass % of $SiO_2$, 10 to 20 mass % of $Al_2O_3$, 4 to 8 mass % of MgO, 20 to 40 mass % of CaO, 0 to 3 mass % of $Fe_2O_3$ and 0 to 1 mass % of MnO. As examples of such rock wool, one having a shrinkage in the longitudinal direction of 10% or more when subjecting to a heat treatment at 800° C. for 24 hours in the atmosphere of air ({length before heating−length after heating}/length before heating}×100) and a shrinkage in the longitudinal direction of 12% or more when subjecting to a heat treatment at 1100° C. for 24 hours in the atmosphere of air can be given.

It is preferred that the rock wool have an average fiber diameter of 1 to 50 µm, more preferably 1.5 to 10 µm, with 2 to 6 µm being further preferable. If the average fiber diameter is less than 1 µm, the rock wool tends to be broken easily. As a result, the resulting refractory shaped article tends to have a lower strength. On the other hand, if the fiber diameter exceeds 50 µm, the density of the refractory shaped article is decreased, whereby the resulting refractory shaped article tends to have a lower strength. It is preferred that the average fiber length of the rock wool be 1 to 200 mm, more preferably 2 to 50 mm, with 10 to 50 mm being further preferable. If the average fiber length is within the above-mentioned range, a refractory shaped article having an appropriate density can be obtained easily.

In the specification, the average fiber diameter and the average fiber length each mean the average value when the fiber diameters and the fiber lengths of 300 to 500 fibers of the rock wool as samples are measured by means of an optical microscope.

It is preferred that the materials constituting the inorganic fibrous shaped refractory article of the invention comprise 2 to 95 mass %, preferably 9 to 81 mass %, and more preferably 18 to 72 mass % of the rock wool.

Due to the presence of the rock wool in an amount of 2 to 95 mass %, it is possible to provide a refractory shaped article excellent in heat retaining properties (heat insulating properties) and lightweightness, while keeping the minimum required strength and resistance to corrosion.

In the inorganic fibrous shaped refractory article of the invention, the rock wool serves as an aggregate.

The rock wool has a heat shrinkage temperature of about 650° C., and has a lower heat resistance as compared with alumina (α-alumina: melting point: 2053° C.) or silica (melting point: 1650° C.). Therefore, it was thought that the rock wool was not suitable for use as the aggregate of a refractory shaped article as compared with ceramic fibers such as alumina fibers or silica fibers.

However, as a result of intensive studies, the inventors have found that by using constituent materials which contain a specific amount of rock wool which has a low heat resistance for use in a refractory shaped article and a specific amount of inorganic powder having a needle-like crystal structure, a high heat resistance can be obtained due to the interaction of the rock wool and the inorganic powder. The invention has been made based on this finding.

The constituting materials of the inorganic fibrous shaped refractory article of the invention comprise inorganic powder having a needle-like crystal structure.

As the inorganic powder having a needle-like crystal structure, a natural mineral or a synthetic material can be given. Specific examples thereof include wollastonite powder, sepiolite powder and attapulgite powder.

Wollastonite is an inorganic substance of which the crystal structure is in the form of a needle, which is represented by $CaSiO_3(CaO.SiO_2)$ and has an endless silicon-oxygen chain $(SiO_3)$ structure which is bonded by calcium cation. The wollastonite as a natural mineral is produced in a limestone area as tabular spar. It may contain a slight amount (less than 0.5 wt %, for example) of $Al_2O_3$ or $Fe_2O_3$ as impurities.

Sepiolite is a clay-like hydrated magnesium silicate mineral, and is an inorganic substance of which the crystal structure is in the form of a needle represented by a composition formula $Mg_4Si_6O_{15}(OH)_2.6H_2O$. Attapulgite is a clay-like hydrated aluminum silicate magnesium compound, and is an inorganic substance of which the crystal structure is in the form of a needle represented by a composition formula $Si_8O_{20}Mg_5(OH)_2.Al(OH_2)_4.4H_2O$.

In the material constituting the inorganic fibrous shaped refractory article of the invention, as the inorganic powder having a needle-like crystal structure, one having an average length of 1 to 3000 µm is preferable, one having an average length of 2 to 2000 µm is more preferable, and one having an average length of 3 to 1000 µm is further preferable. As the inorganic powder having a needle-like crystal structure, one having an average diameter of 1 to 100 µm is preferable. One having an average diameter of 1 to 90 µm is more preferable, and one having an average diameter of 1 to 80 µm is further preferable. As the inorganic powder having a needle-like crystal structure, one having an aspect ratio of 1 to 1000 is preferable, one having an aspect ratio of 2 to 100 is more preferable, and one having an aspect ratio of 3 to 50 is further preferable.

The average length and the average diameter of the inorganic powder having a needle-like crystal structure each mean the average value of the length and the diameter of 300 to 500 inorganic powder as the sample which are measured by means of an optical microscope.

The aspect ratio of the inorganic powder having a needle-like crystal structure can be obtained by dividing the average length of the inorganic powder by the average diameter of the inorganic powder.

The materials constituting the inorganic fibrous shaped refractory article of the invention comprise 2 to 95 mass % of the inorganic powder having a needle-like crystal structure. The materials preferably comprise 9 to 81 mass %, more preferably 18 to 72 mass %, of the inorganic powder.

The inorganic fibrous shaped refractory article comprises 2 to 95 mass % of the inorganic powder having a needle-like crystal structure. Therefore, it can exhibit desired heat resistance due to the interaction with the rock wool, and at the same time, can reduce the production cost and the product price.

For the materials constituting the inorganic fibrous shaped refractory article of the invention, as the inorganic powder having a needle-like crystal structure, wollastonite having a melting point of 1500° C., sepiolite having a melting point of 1550° C. or the like is used. Since these inorganic powder have a lower melting point than those of alumina (α-alumina: melting point 2053° C.) or silica (melting point 1650° C.), they were conventionally thought to be unsuitable as the material constituting a refractory shaped article.

However, as a result of intensive studies, the inventors have found that by using constituting materials comprising a specific amount of inorganic powder such as wollastonite or sepiolite which has a low melting point and hence was thought to have little effects of improving the heat resistance and a specific amount of rock wool having a low heat resistance, an inorganic fibrous shaped refractory article exhibiting excellent heat resistance due to the interaction of the inorganic powder having a needle-like crystal structure and rock wool can be obtained. The invention has been made based on this finding.

The inorganic powder having a needle-like crystal structure such as wollastonite is more inexpensive as compared with alumina powder or the like and is easily available, and hence, it can reduce the production cost and the product price of the inorganic fibrous shaped refractory article.

The materials constituting the inorganic fibrous shaped refractory article of the invention comprise 3 to 32 mass %, preferably 5.5 to 22 mass %, of a binder. It is more preferred that the materials comprise 7 to 18 mass % of a binder.

In the inorganic fibrous shaped refractory article of the invention, as the binder, one or more binders selected from an inorganic binder and an organic binder can be given. If a plurality of binders is used, the above-mentioned content of the binder means the total amount of binders used.

As the inorganic binder, one or more selected from colloidal silica such as anionic colloidal silica and cationic colloidal silica, fumed silica, alumina sol, zirconia sol and titania sol can be given.

As mentioned later, by conducting a firing treatment at high temperatures during the production or use of the refractory shaped article, the above-mentioned inorganic binder takes the form of an oxide such as silica or alumina. In this specification, a binder in any form before and after the above-mentioned firing treatment is referred to as the "inorganic binder". Further, in this specification, the amount ratio of the inorganic binder is a value when the binder is converted into an oxide.

It is preferred that the materials constituting the inorganic fibrous shaped refractory article of the invention contain 3 to 20 mass %, more preferably 3.5 to 15 mass %, further preferably 4 to 12 mass % of an inorganic binder in terms of an oxide.

In the materials constituting the inorganic fibrous shaped refractory article of the invention, if the content of the inorganic binder is less than 3 mass %, it is difficult to obtain an effect of improving the strength when used under high temperatures. If the content of the inorganic binder exceeds 20 mass %, the water-filtration performance during the dehydration shaping step is lowered in the production of the refractory shaped article, as mentioned later, and as a result, the production efficiency is lowered.

As mentioned later, an inorganic binder such as colloidal silica enables rock wools to be firmly bonded together by firing the inorganic binder with rock wool at a temperature of about 600 to 1100° C. Therefore, after drying a preliminary shaped article obtained by subjecting the raw material to dehydration shaping, by subjecting it to a firing treatment or by firing together with an object to be treated in an industrial furnace or the like, it can exhibit high performance as a binder.

As the organic binder, starch, an acrylic resin, polyacrylamide or the like can be given.

It is preferred that the materials constituting the inorganic fibrous shaped refractory article of the invention contain 0.1 to 12 mass %, more preferably 2 to 7 mass % and further preferably 3 to 6 mass % of an organic binder.

In the inorganic fibrous shaped refractory article of the invention, if the amount ratio of the organic binder is less than 0.1 mass %, when a preliminary shaped article is subjected to a drying treatment in the production of a refractory shaped article, which is described later, the dried article may not have a sufficient strength. If the amount ratio of the organic binder exceeds 12 mass %, when a dried article is fired, the amount of an exhausted combustion gas may be increased or the inorganic fibrous shaped refractory article may absorb moisture during storage, thereby to deteriorate the properties thereof.

Due to the presence of an organic binder in the inorganic fibrous shaped refractory article of the invention, as mentioned later, at the time of producing the inorganic fibrous shaped refractory article, a refractory shaped article obtained by subjecting a raw material to dehydration shaping and drying can have a sufficient shape-retaining property and strength.

The materials constituting the inorganic fibrous shaped refractory article of the invention contain the rock wool, the inorganic powder having a needle-like crystal structure and the binder as mentioned above in a total amount of preferably 50 mass % or more, more preferably 70 mass % or more, and further preferably 90 mass % or more.

Due to the presence of the rock wool, the inorganic powder having a needle-like crystal structure and the binder in a total amount of 50 mass % or more, heat resistance of the inorganic fibrous shaped refractory article of the invention can be improved more effectively.

The materials constituting the inorganic fibrous shaped refractory article of the invention may contain powdery filler or powder aggregate according to need. Due to the presence of such filler or aggregate, mechanical strength of the inorganic fibrous shaped refractory article can be improved.

As the filler or the aggregate, a lightweight aggregate such as chamotte and ceramic balloon, inorganic powder such as alumina, silica, cordierite, diatomite, zircon, zirconia, magnesia and calcia, and a clay mineral such as kaolinite can be given.

The materials constituting the inorganic fibrous shaped refractory article of the invention may contain an appropriate amount of a dispersant such as sodium hexamethaphosphate, sodium tripolyphosphate and sodium ultrapolyphosphate, and a coagulant such as aluminum sulfate and polyacrylamide, if necessary.

The materials constituting the inorganic fibrous shaped refractory article of the invention may contain a filler or an aggregate in an amount of 1 to 30 mass %, a dispersant in an amount of 0.5 to 10 mass % and a coagulant in an amount of 0.5 to 10 mass %, if necessary.

In the inorganic fibrous shaped refractory article of the invention, since the materials constituting the refractory shaped article contain a specific amount of rock wool and a specific amount of inorganic powder having a needle-like crystal structure, the rock wool and the inorganic powder can undergo interaction. Therefore, a desired heat resistance can be exhibited without containing ceramic fibers such as alumina silicate fiber, alumina powder and silica powder, and the production cost and the product price can be reduced.

The inorganic fibrous shaped refractory article of the invention preferably has a shrinkage in the longitudinal direction after a 24-hour heat treatment at 1100° C. in the air atmosphere ({length before heating−length after heating}/ length before heating})×100) of preferably 5% or less, for example, more preferably 3.0% or less, with 1.0% or less being more preferable.

Since the inorganic fibrous shaped refractory article of the invention comprises a specific amount of rock wool and a specific amount of inorganic powder having a needle-like crystal structure, excellent heat resistance can be exhibited by the interaction of the rock wool and the inorganic powder having a needle-like crystal structure.

The inorganic fibrous shaped refractory article of the invention has a bulk density of 0.05 to 1.0 g/cm$^3$, for example, preferably 0.08 to 0.70 g/cm$^3$, more preferably 0.1 to 0.5 g/cm$^3$.

The inorganic fibrous shaped refractory article of the invention has a bending strength of 0.1 to 2.0 MPa, for example, and preferably 0.2 to 1.5 MPa.

The inorganic fibrous shaped refractory article of the invention may be in the form of a cylinder, a bottomed cylinder, a flat plate, a block or the like, for example.

The inorganic fibrous shaped refractory article of the invention can be produced by subjecting a raw material to dehydration shaping in the method for producing the inorganic fibrous shaped refractory article mentioned later. In the invention, the inorganic fibrous shaped refractory article includes, in addition to one obtained by drying a preliminary shaped article which is obtained by dehydration shaping, one obtained by further subjecting the preliminary shaped article to a firing treatment. In the case of the inorganic fibrous shaped refractory article which is not subjected to a firing treatment after the dehydration shaping, it can become a fired product by arranging it at a desired position as a refractory material, and then heating with an object to be treated during use.

The inorganic fibrous shaped refractory article of the invention can be used preferably as a lining material or a heat-insulating material for the ceiling or walls inside a heating chamber in an industrial furnace, a firing furnace, a heat-treatment apparatus or the like.

Method for Producing an Inorganic Fibrous Shaped Refractory Article

Next, the method for producing an inorganic fibrous shaped refractory article of the invention will be explained.

The method for producing an inorganic fibrous shaped refractory article of the invention comprises subjecting a slurry comprising, in terms of solid matters, 2 to 95 mass % of rock wool, 2 to 95 mass % of inorganic powder having a needle-like crystal structure and 3 to 32 mass % of a binder to a dehydration molding.

In the method for producing the inorganic fibrous shaped refractory article of the invention, the rock wool serves as the aggregate of the resulting refractory shaped article. As the example of the rock wool, the same examples as those mentioned above can be given.

In the method for producing the inorganic fibrous shaped refractory article of the invention, the rock wool is contained in a slurry in an amount of 2 to 95 mass %, preferably 9 to 81 mass %, more preferably 18 to 72 mass % in terms of solid matters.

In the method for producing the inorganic fibrous shaped refractory article of the invention, the inorganic powder having a needle-like crystal structure is a substance which can improve the heat resistance of the resulting refractory shaped article due to the interaction with the rock wool in the article. As the inorganic powder having a needle-like crystal structure, the same powder as mentioned above can be given.

In the method for producing the inorganic fibrous shaped refractory article of the invention, the inorganic powder having a needle-like crystal structure is contained, in terms of solid matters, in an amount of 2 to 95 mass %, preferably 9 to 81 mass %, and more preferably 18 to 72 mass % in a slurry.

In the method for producing the inorganic fibrous shaped refractory article of the invention, the binder is contained in a slurry in an amount of 3 to 32 mass %, preferably 5.5 to 22 mass %, more preferably 7 to 18 mass %, in terms of solid matters.

In the method for producing the inorganic fibrous shaped refractory article of the invention, as the binder, the inorganic binders or the organic binders as mentioned above can be given.

In the method for producing the inorganic fibrous shaped refractory article of the invention, the inorganic binder is contained in a slurry preferably in an amount of 3 to 20 mass %, more preferably 3.5 to 15 mass %, and further preferably 4 to 12 mass % in terms of oxides.

If the content of the inorganic binder in the solid matter constituting the slurry is less than 3 mass % in terms of oxides, an oxide film may not be formed speedy on the surface of the refractory shaped article. On the other hand, if the content of the binder exceeds 20 mass %, the moisture content is increased, whereby working performance at the time of dehydration shaping is lowered.

In the method for producing the organic fibrous shaped refractory article of the invention, it is preferred that the organic binder be contained in an amount of 0.1 to 12 mass %, more preferably 2 to 7 mass %, and further preferably 3 to 6 mass % in the solid matters constituting the slurry.

If the amount ratio of the organic binder is less than 0.1 mass %, a dried product which is obtained by drying after the dehydration shaping may not have a sufficient strength. If the amount ratio of the organic binder exceeds 12 mass %, the amount of the exhausted combustion gas generated when the dried shaped article is fired may be increased or the properties of the resulting refractory shaped article may be deteriorated due to the absorption of moisture during the storage.

In the method for producing the inorganic fibrous shaped refractory article of the invention, the slurry preferably contains the rock wool, the inorganic binder having a needle-like crystal structure and a binder in a total amount of 50 mass % or more, more preferably 70 mass % or more and 90 mass % or more in terms of solid matters.

In the method for producing the inorganic fibrous shaped refractory article of the invention, due to the presence of the rock wool, the inorganic powder having a needle-like crystal structure and the binder in a total amount of 50 mass % or more in terms of solid matters in a slurry, the heat resistance of the resulting refractory shaped article can be improved more effectively.

In the method for producing the inorganic fibrous shaped refractory article of the invention, the slurry may contain a filler, an aggregate, a dispersant or a coagulant in the form of powder according to need. As a result, the mechanical strength of the resulting inorganic fibrous shaped refractory article can be improved.

Specific examples of the filler, the dispersant and the coagulant are the same as those mentioned in the description of the inorganic fibrous shaped refractory article. It is preferred that these components be mixed in the same amount in terms of solid matters as those mentioned in the description of the inorganic fibrous shaped refractory article.

Although no specific restrictions are imposed on the liquid solvent for forming a slurry in the method for producing the inorganic fibrous shaped refractory article of the invention, water and a polar organic solvent can be given. As the polar organic solvent, a monovalent alcohol such as ethanol and propanol and a divalent alcohol such as ethylene glycol can be given. Taking working environments or possible impacts on the environment into consideration, water is preferable. Although no specific restrictions are imposed on water, distilled water, ion exchange water, tap water, ground water, industrial water or the like can be given.

The solid matter content of the slurry is preferably 0.1 to 10 mass %, more preferably 0.3 to 8 mass %, and further preferably 0.5 to 3 mass %. If the above-mentioned solid matter content of the slurry is less than 0.1 mass %, the amount of water to be removed in the dehydration molding process becomes inefficiently large. On the other hand, if the solid matter content of the slurry exceeds 10 mass %, the solid matters may hardly be dispersed uniformly in the slurry.

In the method for producing the inorganic fibrous shaped refractory article of the invention, the order of mixing raw materials such as the rock wool, the inorganic powder having a needle-like crystal structure and the binder in a liquid medium at the time of forming a slurry is not particularly restricted. These materials may be mixed in a liquid medium sequentially or simultaneously.

In the method for producing the inorganic fibrous shaped refractory article of the invention, the above-mentioned slurry is subjected to a dehydration shaping treatment, whereby the liquid medium is removed.

In the method for producing the refractory shaped article of the invention, the slurry may contain other mediums than water as the liquid medium. In the invention, removing other liquid mediums than water is also referred to as the dehydration shaping.

Dehydration shaping can be conducted by absorption dehydration shaping, pressure dehydration shaping or absorption pressure shaping, for example. In the absorption dehydration shaping, the slurry is poured into a mold in which a net is provided at the bottom thereof, and the liquid medium such as water is then absorbed.

In the method for producing the inorganic refractory shaped article of the invention, when conveying the slurry to a mold or the like, a pump or the like may be used, or the slurry may be conveyed by its own weight by arranging a mold under the chamber containing the above-mentioned slurry.

A suitable dehydrated product is one which has a shape approximate to a refractory shaped article to be obtained. As for the shape of a dehydrated product, a cylindrical shape, a bottomed cylindrical shape, a plate-like shape and a block-like shape can be given.

It is preferred that the resulting dehydrated product be dried by means of a drier or the like. The drying temperature is preferably 40 to 180° C., more preferably 60 to 150° C. and further preferably 80 to 120° C. The drying time is preferably 6 to 48 hours, more preferably 8 to 40 hours, with 10 to 36 hours being further preferable. Further, as for the atmosphere at the time of drying, air, oxygen, nitrogen or the like can be given.

In the method for producing the refractory shaped article of the invention, after subjecting the above-mentioned dehydrated shaped product to a drying treatment, it may further be subjected to a firing treatment.

It is preferred that the firing temperature be 600 to 1100° C., more preferably 700 to 1000° C., with 800 to 1000° C. being further preferable. Although no specific restrictions are imposed on the atmosphere at the time of firing, air, oxygen or nitrogen is preferable. The firing time is preferably 0.5 to 36 hours, more preferably 1 to 30 hours, with 3 to 24 hours being further preferable.

By conducting a firing treatment, the shaped article can be degreased in advance, whereby the shrinkage of the shaped article at the time of actual use can be suppressed.

The details of the resulting refractory shaped article are the same as those explained above referring to the refractory shaped article of the invention.

According to the method for producing the refractory shaped article of the invention, an inorganic fibrous shaped refractory article having a desired heat resistance can be produced easily at a low cost and with a low price without containing ceramic fibers such as alumina silicate fibers, alumina powder and silica powder.

Inorganic Fibrous Unshaped Refractory Composition

Next, the inorganic fibrous unshaped refractory composition of the invention will be explained.

The inorganic fibrous unshaped refractory composition of the invention comprises 2 to 95 mass % of rock wool, 2 to 95 mass % of inorganic powder having a needle-like crystal structure and 3 to 32 mass % of a binder in terms of solid matters.

In the inorganic fibrous unshaped refractory composition of the invention, as the rock wool, the same rock wool as those mentioned above referring to the inorganic fibrous shaped refractory article can be given. As for the inorganic powder having a needle-like crystal structure or the binder, the same as those mentioned above referring to the inorganic fibrous shaped refractory article of the invention can be given.

It is preferred that the material constituting the inorganic fibrous unshaped refractory article of the invention contain rock roll in an amount of 2 to 95 mass %, preferably 10 to 90 mass %, and more preferably 20 to 80 mass % in solid matters.

Due to the presence of the rock wool in an amount of 2 to 95 mass % in the solid matters, it is possible to provide an inorganic fibrous unshaped refractory composition which can impart a substance obtained by applying and drying the composition (hereinafter referred to "resulting applied substance") (refractory substance) with heat-retaining (heat-insulating) properties and lightweightness while imparting the substance with the minimum required strength and corrosion resistance.

The materials constituting the inorganic fibrous unshaped refractory composition of the invention contain 2 to 95 mass %, suitably 10 to 90 mass %, more suitably 20 to 80 mass %, of the inorganic powder having a needle-like crystal structure in solid matters.

Due to the presence of the inorganic powder having a needle-like crystal structure in an amount of 2 to 95 mass %, a desired heat resistance is exhibited after applying due to the interaction with the inorganic powder having a needle-like crystal structure, and also the production cost or the product price can be reduced.

It is preferred that the materials constituting the inorganic fibrous unshaped refractory composition of the invention contain 3 to 32 mass %, preferably 3.5 to 22 mass % and more preferably 4.0 to 18 mass % of a binder in solid matters.

In the inorganic fibrous unshaped refractory composition of the invention, as the binder, one or more selected from an inorganic binder or an organic binder can be given. If a plurality of binders is used, the content of the above-mentioned binder means the total amount of the binders used.

It is preferred that the materials constituting the inorganic fibrous unshaped refractory composition of the invention contain, in solid matters, 3 to 20 mass %, more preferably 3 to 15 mass %, further preferably 3 to 12 mass % in terms of oxides of the inorganic binder. Further, the organic binder is contained preferably in an amount of 0.1 to 12 mass %, more preferably 0.5 to 7 mass %, and further preferably 1.0 to 6 mass %.

In the inorganic fibrous unshaped refractory composition of the invention, it is preferred that the rock wool, the inorganic binder having a needle-like crystal structure and the binder be contained in a total amount of 50 mass % or more, more preferably 70 mass % or more and further preferably 90 mass % or more in solid matters.

In the materials constituting the inorganic fibrous unshaped refractory composition of the invention, due to the presence of the rock wool, the inorganic powder having a needle-like crystal structure and the binder in a total amount of 50 mass % or more in solid matters, it is possible to impart the resulting applied substance (refractory substance) with a desired heat resistance effectively.

The materials constituting the inorganic fibrous unshaped refractory composition of the invention may contain, according to need, a powdery filler or aggregate as an optional component. Due to the presence of these materials, the mechanical strength of the inorganic fibrous shaped refractory article can be improved.

Specific examples of the filler or the aggregate are the same as those mentioned as referring to the refractory shaped article of the invention. The amount of the filler or the aggregate in terms of solid matters is the same as those mentioned referring to the refractory shaped article of the invention.

The unshaped refractory composition of the invention may contain an additive such as a pH adjustor, a thickener, a dispersant and an antiseptic.

As the pH adjustor, a buffer solution such as a phthalate standard solution (Sorensen's buffer solution) which is a standard solution with a pH of 4, a neutral phosphate pH standard equimolal solution which is a standard solution with a pH of 7 or the like can be given. Specific examples of the acid include fruit acids such as acetic acid, malic acid and citric acid.

The content of the buffer solution or the acid is preferably an amount which allows the pH of the unshaped refractory composition to be 3 to 11.

As the thickener, hydroxyethyl cellulose, sodium polyacrylate, or the like can be given. As the dispersant, carboxylic acids, polyvalent alcohols, amines or the like can be given. As the antiseptic, an organic or inorganic compound containing a nitrogen atom or a sulfur atom can be given.

In the inorganic fibrous unshaped refractory composition of the invention, as for the unshaped composition, a paste-like composition obtained by mixing solid matters with a liquid solvent or the like can be given.

Although no specific restrictions are imposed on a liquid solvent forming a paste, water and a polar organic solvent can be given. Specific examples of the polar organic solvent include a monovalent alcohol such as ethanol and propanol and a divalent alcohol such as ethylene glycol. Of these liquid solvents, water is preferable in respect of working environments or possible impacts on the environment. Although no particular restrictions are imposed on water, distilled water, ion-exchange water, tap water, ground water, industrial water or the like can be given.

The viscosity of the paste-like product, i.e. the concentration of solid matters in the solvent, is appropriately determined taking into consideration the purpose of use or the workability. For example, the content of the solvent is preferably 20 to 800 mass %, more preferably 30 to 500 mass %, and further preferably 40 to 300 mass %, relative to 100 mass % of the solid matters of the inorganic fibrous unshaped refractory composition of the invention. If the content of the above-mentioned solvent is less than 20 mass %, ease in applying becomes poor since the fluidity of the inorganic fibrous unshaped refractory composition is deteriorated. In addition, the mechanical strength, the bending strength, in particular, of the resulting applied substance is lowered. Further, if the content of the solvent exceeds 800 mass %, the consistency of the inorganic fibrous unshaped refractory composition is increased, and as result, the paste-like composition falls in drops during application. Further, a resulting applied substance, for example a substance applied in joint undergoes significant shrinkage by drying.

The inorganic fibrous unshaped refractory composition of the invention is, for example, used in joint between the refractory shaped articles which are used as a lining material of a member which is in contact with a molten material such as a drainpipe, a molten material holding furnace and a ladle in a non-ferrous metal casting apparatus. By drying or firing, it can become a substance having an arbitral shape. Except that the substance can take an arbitral shape by applying the unshaped refractory composition, the composition or the physical properties of the constituting materials thereof are the same as those of the refractory shaped article of the invention. A metal oxide film can be smoothly formed on the surface of the substance, which fills in narrow spaces between articles (joint), for example.

For example, the inorganic fibrous unshaped refractory composition of the invention can be preferably used as a joint for a lining material of a member which is in contact with a molten material such as a drainpipe, a molten material holding furnace and a ladle in a casting apparatus of a non-ferrous metal such as aluminum and magnesium.

Next, the method for producing the inorganic fibrous unshaped refractory composition of the invention will be explained.

As the method for producing the unshaped refractory composition of the invention, a method in which constituting materials such as the rock wool, the inorganic powder having a needle-like crystal structure and the binder as mentioned above are mixed with a liquid solvent can be given.

The amount of the constituting materials and the solvent of the inorganic fibrous unshaped refractory composition of the invention is as mentioned above.

A preferable method for producing the inorganic fibrous unshaped refractory composition of the invention is a method in which the rock wool, the inorganic powder having a needle-like crystal structure and the binder are added to a liquid solvent, further adding other components such as a thickener and an antiseptic, if desired.

As the method for mixing the above-mentioned constituting materials and the solvent, kneading by means of a kneading apparatus such as a kneader and a pressure kneader can be given. The kneading time is preferably 0.1 to 1.0 hour, and the kneading temperature is preferably 5 to 40° C.

The inorganic fibrous unshaped refractory composition of the invention can allow the resulting applied substance (refractory substance) to exhibit desired heat resistance without containing ceramic fibers such as alumina silicate fibers, alumina powder or silica powder, and, at the same time, the product cost and the production price can be reduced.

The invention will be described in more detail with reference to the following examples, which should not be construed as limiting the scope of the invention.

Example 1

1. Slurry-Forming Step

As shown in Table 1, to 100 parts by mass of a raw material comprising 90 mass % of rock wool ("MG bulk" manufactured by Nichias Corporation; rock wool composition: $SiO_2$: 43.5 mass %, $Al_2O_3$: 13.3 mass %, MgO: 6.1 mass %, CaO: 33.9 mass %, $Fe_2O_3$: 0.1 mass %, MnO: 0.3 mass %), 10 mass % of wollastonite ("SH-600" manufactured by Kinsei Matec Co., Ltd.; average length: 90 μm, aspect ratio: 4.5), 5.5 mass % in terms of silica of colloidal silica ("ST-30" manufactured by Nissan Chemical Industries, Inc.), 5 mass % of starch ("Petrosize J" manufactured by Nippon Starch Chemical Inc.) and 0.5 mass % of a coagulant ("Polystron 117" manufactured by Arakawa Chemical Industries, Inc.), 5000 parts by mass of water was added, followed by stirring to form a slurry.

2. Shaping Step

In a shaping mold in which a net was provided at the bottom thereof, the above-mentioned slurry was poured. Dehydration shaping was conducted by absorbing water in the slurry, whereby a dehydrated shaped article in the form of a block was obtained.

Subsequently, in the atmosphere, the shaped product was dried at 105° C. for 24 hours, and as a result, a dried block-shaped product (inorganic fibrous shaped refractory article) having a height of 900 cm, a width of 600 cm and a height of 5 cm was obtained.

The above inorganic fibrous refractory article was produced in plural numbers. The shrinkage in the longitudinal direction of each refractory article when fired in the air at 800° C. for 24 hours and at 1100° C. for 24 hours was determined. The measurement results of the shrinkage are shown in Table 1, together with the composition of the inorganic fibrous shaped refractory article.

Examples 2 to 3 and Comparative Example 1

Inorganic fibrous shaped refractory articles were fabricated in the same manner as in Example 1, except that the composition of a refractory shaped article to be obtained was changed to as shown in Table 1. The shrinkage in the longitudinal direction of each of the resulting shaped articles was determined in the same manner as in Example 1. The measurement results of the shrinkage in the longitudinal direction are shown in Table 1, together with the composition of the inorganic fibrous shaped refractory article.

TABLE 1

|  |  | Example 1 | Example 2 | Example 3 | Com. Ex. 1 |
|---|---|---|---|---|---|
| Composition (mass %) | Rock wool | 81 | 63 | 45 | 90 |
|  | Wollastonite | 9 | 27 | 45 | — |
|  | Colloidal silica | 5 | 5 | 5 | 5 |
|  | Starch | 4.5 | 4.5 | 4.5 | 4.5 |
|  | Coagulant | 0.5 | 0.5 | 0.5 | 0.5 |
| Shrinkage in the longitudinal direction (%) | 800° C. × 24 hr | 3.14 | 0.63 | 0.23 | 21.4 |
|  | 1100° C. × 24 hr | 8.25 | 0.45 | 0.15 | 24.2 |

Examples 4 to 6 and Comparative Example 2

Inorganic fibrous shaped refractory articles were produced in the same manner as in Example 1, except that, as the rock wool, "S fiber" (manufactured by Nippon Rockwool Corporation; rock wool composition: $SiO_2$: 40.6 mass %, $Al_2O_3$: 13.7 mass %, MgO: 4.3 mass %, CaO: 38.6 mass %, $Fe_2O_3$: 0.3 mass %, MnO: 0.3 mass %) was used instead of the "MG bulk" manufactured by Nichias Corporation, and the composition of the refractory shaped article to be obtained was changed to those shown in Table 2. The shrinkage in the longitudinal direction of the resulting refractory shaped article was determined in the same manner as in Example 1.

The measurement results of the shrinkage in the longitudinal direction are shown in Table 2, together with the composition of the inorganic fibrous shaped refractory article.

TABLE 2

|  |  | Example 4 | Example 5 | Example 6 | Com. Ex. 2 |
|---|---|---|---|---|---|
| Composition (mass %) | Rock wool | 81 | 63 | 45 | 90 |
|  | Wollastonite | 9 | 27 | 45 | — |
|  | Colloidal silica | 5 | 5 | 5 | 5 |
|  | Starch | 4.5 | 4.5 | 4.5 | 4.5 |
|  | Coagulant | 0.5 | 0.5 | 0.5 | 0.5 |
| Shrinkage in the londitudinal direction (%) | 800° C. × 24 hr | 2.95 | 0.24 | 0.11 | 21.9 |
|  | 1100° C. × 24 hr | 3.30 | 0.18 | 0.11 | 35.4 |

Examples 7 to 9 and Comparative Example 3

Inorganic fibrous shaped refractory articles were produced in the same manner as in Example 1, except that, as the rock wool, "Lapinus Fiber" (manufactured by Lapinus Corporation; rock wool composition: $SiO_2$: 43.3 mass %, $Al_2O_3$: 16.8 mass %, MgO: 6.1 mass %, CaO: 20.1 mass %, $Fe_2O_3$: 7.6 mass %, MnO: 0.5 mass %) was used instead of the "MG bulk" manufactured by Nichias Corporation, and the composition of the refractory shaped article to be obtained was changed to those shown in Table 3. The shrinkage in the longitudinal direction of the resulting refractory shaped article was determined in the same manner as in Example 1.

The measurement results of the shrinkage in the longitudinal direction are shown in Table 3, together with the composition of the inorganic fibrous shaped refractory article.

TABLE 3

|  |  | Example 7 | Example 8 | Example 9 | Com. Ex. 3 |
|---|---|---|---|---|---|
| Composition (mass %) | Rock wool | 81 | 63 | 45 | 90 |
|  | Wollastonite | 9 | 27 | 45 | — |
|  | Colloidal silica | 5 | 5 | 5 | 5 |
|  | Starch | 4.5 | 4.5 | 4.5 | 4.5 |
|  | Coagulant | 0.5 | 0.5 | 0.5 | 0.5 |
| Shrinkage in the longitudinal direction (%) | 800° C. × 24 hr | 4.15 | 0.54 | 0.34 | 12.9 |
|  | 1100° C. × 24 hr | 6.07 | 0.81 | 0.49 | 14.9 |

Examples 10 to 12

Inorganic fibrous shaped refractory articles were produced in the same manner as in Example 1, except that sepiolite ("Milcon MS-2", manufactured by Showa KDE Co., Ltd., average length: 5 μm and aspect ratio: 40) was used instead of wollastonite ("SH-600" manufactured by Kinsei Matec Co., Ltd.) and the composition of a refractory shaped article to be obtained was changed to those shown in Table 4. The shrinkage in the longitudinal direction of the resulting refractory shaped article was determined in the same manner as in Example 1.

The measurement results of the shrinkage in the longitudinal direction are shown in Table 4, together with the composition of the inorganic fibrous shaped refractory article.

TABLE 4

|  |  | Example 10 | Example 11 | Example 12 |
|---|---|---|---|---|
| Composition (mass %) | Rock wool | 63 | 45 | 27 |
|  | Sepiolite | 27 | 45 | 63 |
|  | Colloidal silica | 5 | 5 | 5 |
|  | Starch | 4.5 | 4.5 | 4.5 |
|  | Coagulant | 0.5 | 0.5 | 0.5 |
| Shrinkage in the longitudinal direction (%) | 800° C. × 24 hr | 2.81 | 2.59 | 2.41 |
|  | 1100° C. × 24 hr | 2.55 | 3.71 | 4.12 |

Tables 1 to 4 demonstrate that the inorganic fibrous shaped refractory articles obtained in Examples 1 to 12 had a shrinkage in the longitudinal direction of 0.11 to 4.15% when fired at 800° C. for 24 hours and a shrinkage in the longitudinal direction of 0.11 to 8.25% when fired at 1100° C. for 24 hours.

On the other hand, the inorganic fibrous shaped refractory articles obtained in Comparative Examples 1 to 3 had a shrinkage in the longitudinal direction of 12.9 to 21.9% when fired at 800° C. for 24 hours and a shrinkage in the longitudinal direction of 14.9 to 35.4% when fired at 1100° C. for 24 hours.

From the results, it can be understood that, since the inorganic fibrous shaped refractory articles obtained in Examples 1 to 12 contain a specific amount of wollastonite with rock wool, they are capable of exhibiting excellent heat resistance.

Further, it can be understood that, since the inorganic fibrous shaped refractory articles obtained in Examples 1 to 12 are capable of exhibiting excellent heat resistance without containing expensive ceramic fibers, alumina powder and silica powder, the production cost and the product price can be reduced.

Further, from the results of Examples 1 to 12, the inorganic fibrous shaped refractory articles having excellent properties can be produced easily.

INDUSTRIAL APPLICABILITY

According to the invention, it is possible to provide an inorganic fibrous shaped refractory article which has high bio-solubility and is capable of achieving desired heat resistance without containing expensive ceramic fibers, alumina powder and silica powder at a low production cost and with a low product price. According to the invention, it is possible to provide a method for producing the inorganic fibrous refractory shaped article easily. Further, according to the invention, it is possible to provide an inorganic fibrous unshaped refractory composition at a low production cost and with a low product price.

The invention claimed is:

1. An inorganic fibrous shaped refractory article comprising materials comprising:
    2 to 95 mass % of rock wool which comprises:
        35-45 mass % $SiO_2$,
        10-20 mass % $Al_2O_3$,
        4-8 mass % MgO, and
        20-40 mass % CaO;
    2 to 95 mass % of inorganic powder having a needle-like crystal structure; and
    3 to 32 mass % of a binder.

2. The inorganic fibrous shaped refractory article according to claim 1, wherein the inorganic powder having a needle-like crystal structure has an average length of 1 to 3000 μm and an aspect ratio of 2 to 1000.

3. The inorganic fibrous shaped refractory article according to claim 1 or 2, wherein the inorganic powder having a needle-like crystal structure is wollastonite powder or sepiolite powder.

4. The inorganic fibrous shaped refractory article according to claim 1, wherein the only inorganic powder having a needle-like crystal structure is one or more selected from the group consisting of sepiolite powder and attapulgite powder.

5. The inorganic fibrous shaped refractory article according to claim 1, wherein the materials comprise 45 to 95 mass % of the rock wool, and 2 to 45 mass % of the inorganic powder having a needle-like crystal structure.

6. The inorganic fibrous shaped refractory article according to claim 1, wherein the materials comprise 18 to 95 mass % of the rock wool, 2 to 72 mass % of the inorganic powder having a needle-like crystal structure, and 3 to 22 mass % of the binder.

7. The inorganic fibrous shaped refractory article according to claim 1, wherein the materials comprise 90 mass % or more of the rock wool, the inorganic powder having a needle-like crystal structure and the binder.

8. A method for producing an inorganic fibrous shaped refractory article, wherein a slurry comprising materials comprising, in terms of solid matters:
    2 to 95 mass % of rock wool which comprises:
        35-45 mass % $SiO_2$,
        10-20 mass % $Al_2O_3$,
        4-8 mass % MgO, and
        20-40 mass % CaO;
    2 to 95 mass % of inorganic powder having a needle-like crystal structure; and
    3 to 32 mass % of a binder,
is subjected to dehydration shaping.

9. The method for producing an inorganic fibrous shaped refractory article according to claim 8, wherein the only inorganic powder having a needle-like crystal structure is one or more selected from the group consisting of sepiolite powder and attapulgite powder.

10. The method for producing an inorganic fibrous shaped refractory article according to claim 8, wherein the slurry comprises 45 to 95 mass % of the rock wool, and 2 to 45 mass % of the inorganic powder having a needle-like crystal structure.

11. The method for producing an inorganic fibrous shaped refractory article according to claim 8, wherein the slurry comprises 18 to 95 mass % of the rock wool, 2 to 72 mass % of the inorganic powder having a needle-like crystal structure, and 3 to 22 mass % of the binder.

12. The method for producing an inorganic fibrous shaped refractory article according to claim 8, wherein the slurry comprises 90 mass % or more of the rock wool, the inorganic powder having a needle-like crystal structure, and the binder.

13. An inorganic fibrous unshaped refractory composition comprising materials comprising, in terms of solid matters:
    2 to 95 mass % of rock wool which comprises:
        35-45 mass % $SiO_2$,
        10-20 mass % $Al_2O_3$,
        4-8 mass % MgO, and
        20-40 mass % CaO;
    2 to 95 mass % of inorganic powder having a needle-like crystal structure; and
    3 to 32 mass % of a binder.

14. The inorganic fibrous unshaped refractory composition according to claim 13, wherein the only inorganic powder having a needle-like structure is one or more selected from the group consisting of sepiolite powder and attapulgite powder.

15. The inorganic fibrous unshaped refractory composition according to claim 13, wherein the materials comprise 45 to 95 mass % of the rock wool, and 2 to 45 mass % of the inorganic powder having a needle-like crystal structure.

16. The inorganic fibrous unshaped refractory composition according to claim 13, wherein the materials comprise 18 to 95 mass % of the rock wool, 2 to 72 mass % of the inorganic powder having a needle-like crystal structure, and 3 to 22 mass % of the binder.

17. The inorganic fibrous unshaped refractory composition according to claim 13, wherein the materials comprise 90 mass % or more of the rock wool, the inorganic powder having a needle-like crystal structure, and the binder.

* * * * *